United States Patent
Kempf et al.

(10) Patent No.: US 10,028,501 B2
(45) Date of Patent: Jul. 24, 2018

(54) INSECT REPELLANT APPARATUS WITH IMPRINTED GLASS MARBLES AND ASSOCIATED METHODS

(71) Applicant: Eco-Solutions, Winter Park, FL (US)

(72) Inventors: Ed Kempf, New Port Richey, FL (US); Manfred Bauer, New Port Richey, FL (US)

(73) Assignee: ECO-SOLUTIONS, Winter Park, FL (US)

( * ) Notice: Subject to any disclaimer, the term of this patent is extended or adjusted under 35 U.S.C. 154(b) by 198 days.

(21) Appl. No.: 15/145,156

(22) Filed: May 3, 2016

(65) Prior Publication Data
US 2017/0318798 A1  Nov. 9, 2017

(51) Int. Cl.
*A01M 29/18* (2011.01)
*A01M 29/22* (2011.01)

(52) U.S. Cl.
CPC ........... *A01M 29/18* (2013.01); *A01M 29/22* (2013.01); *A01M 2200/01* (2013.01)

(58) Field of Classification Search
CPC ...... A01M 29/00; A01M 29/18; A01M 29/24; A01M 29/28; A01M 2200/01; A01M 2200/011; A01M 2200/012; G02B 5/003
USPC ........... 116/22 A; 340/573.1, 573.2; 359/350
See application file for complete search history.

(56) References Cited

U.S. PATENT DOCUMENTS

| | | | | |
|---|---|---|---|---|
| 3,997,785 | A * | 12/1976 | Callahan | H01S 3/00 250/338.1 |
| 4,982,100 | A * | 1/1991 | Harding, Jr. | A01M 29/08 250/493.1 |
| 5,424,551 | A * | 6/1995 | Callahan | A01M 1/02 250/493.1 |
| 8,211,419 | B2 * | 7/2012 | Siljander et al. | A01M 1/026 424/84 |
| 8,389,035 | B1 | 3/2013 | Vollmers et al. | |
| 8,984,800 | B2 * | 3/2015 | Canfield et al. | A01M 1/04 250/493.1 |
| 2014/0063595 | A1 * | 3/2014 | Jang et al. | G02B 5/22 359/350 |

FOREIGN PATENT DOCUMENTS

JP           2002272353 A *  9/2002  ............ A01M 29/00

* cited by examiner

*Primary Examiner* — R. A. Smith
(74) *Attorney, Agent, or Firm* — Allen, Dyer, Doppelt + Gilchrist, PA

(57) ABSTRACT

An apparatus includes a base, a body coupled to the base and having slopped sidewalls, and imprinted glass marbles carried by the body. Each imprinted glass marble is configured to transmit terahertz frequencies from 300 GHz to 3 THz. The slopped sidewalls direct the transmitted terahertz frequencies above the body.

23 Claims, 4 Drawing Sheets

INSECT REPELLANT APPARATUS WITH IMPRINTED GLASS MARBLES AND ASSOCIATED METHODS

FIELD OF THE INVENTION

The present invention relates to radiation sources, and more particularly, to a terahertz radiation source used as an insect repellant.

BACKGROUND OF THE INVENTION

There is a spectrum of electromagnetic radiation striking the earth on a daily basis originating from the sun. The electromagnetic radiation includes commonly known spectra such as the visible and ultraviolet regions, for example.

The full spectrum is characterized by the term EOF representing the electro optical frequencies of solar radiation. The bands of these frequencies are characterized based upon wavelengths into nine general regions illustrated by the solar spectrum. These nine categories of increasing wavelength from 100 nm to 1 mm include ultraviolet C, ultraviolet B, ultraviolet A, visible light, infrared A, infrared B, infrared C, far infrared, and extreme far infrared.

The extreme far infrared is part of the terahertz spectrum. This special region known as terahertz spectrum radiation or the terahertz gap falls between electromagnetic frequencies (measured with antennas) and optical frequencies (measured with optical detectors). There are currently no known natural sources of terahertz radiation in the extreme far infrared region.

Terahertz radiation is a non-ionizing sub-millimeter radiation and shares with X-rays the capability to penetrate a wide variety of non-conductive materials. Terahertz radiation can pass through clothing, paper, cardboard, wood, masonry, and plastic. It can also penetrate fog and clouds, but cannot penetrate metal or water.

Terahertz radiation is not expected to damage tissues and DNA unlike X-rays. Some frequencies of terahertz radiation can penetrate several millimeters of tissue with low water content and are reflected back. Terahertz radiation is being studied more and more these days in the fields of medical imaging, biochemistry, diagnostics and therapeutics.

U.S. Pat. No. 8,389,035 discloses a method of generating and collecting radiation in the terahertz range of the extreme far infrared region. The '035 patent is assigned to the current assignee of the present disclosure, and is incorporated herein by reference in its entirety. In particular, water is imprinted so as to emit terahertz radiation. The water is imprinted with frequencies from 300 GHz to 3 THz using a polarizing filter through which the polarized radiation passes into the water. Imprinted water may be used to reduce the activity of pathogens and maintain the freshness of food products in a closed environment. Even in view of the '035 patent, there is still a need to improve on the use of radiation in the terahertz frequency range.

SUMMARY OF THE INVENTION

An apparatus comprises a base, and a body is coupled to the base and has slopped sidewalls. Imprinted glass marbles are carried by the body. Each imprinted glass marble is configured to transmit terahertz frequencies from 300 GHz to 3 THz. The slopped sidewalls direct the transmitted terahertz frequencies above the body.

The terahertz frequencies transmitted from the imprinted glass marbles may advantageously alter the environment in an area where the apparatus is located. When insects fly into the terahertz frequencies they may be repelled.

The body may comprise a transparent material, such as acrylic glass. Each imprinted glass marble may comprise quartz, or natural glass that is devoid of impurities, chemicals and lead.

The base may have a rectangular shape, and the slopped sidewalls of the body may be angled towards one another so as to form a pyramid.

In another embodiment, the base may have a rectangular shape, and the body may have an upper surface parallel to the base, with the slopped sidewalls of the body being angled towards the upper parallel surface so as to form a frustum pyramid.

The apparatus may further comprise a protective enclosure having an opening therein to receive the base and the body carrying the imprinted glass marbles.

Another aspect is directed a method for making an apparatus as discussed above. The method may comprise providing a base and a body, with the body having slopped sidewalls, and imprinting glass marbles. Each imprinted glass marble may be configured to transmit terahertz frequencies from 300 GHz to 3 THz. The method may further comprise coupling the body to the base, with the body carrying the plurality of imprinted glass marbles. The slopped sidewalls may direct the transmitted terahertz frequencies above the body.

Imprinting the glass marbles may comprise imprinting water by exposing the water to reflected sunlight so as to absorb terahertz frequencies from 300 GHz to 3 THz, with the water comprising soluble inorganic salts and minerals, and placing the glass marbles in the imprinted water to absorb the terahertz frequencies from the imprinted water.

The reflected sunlight may be passed through a polarization filter. The method may further comprise rotating the plurality of glass marbles in the imprinted water so as to evenly absorb the terahertz frequencies from the imprinted water.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
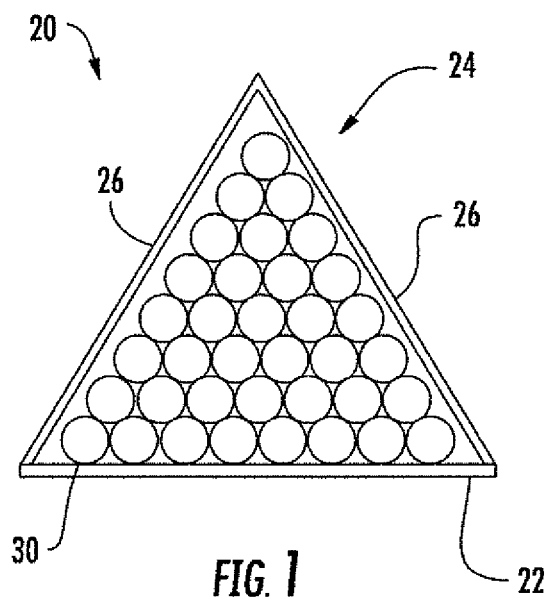
FIG. 1 is a side view of an insect repellent apparatus in accordance with the present invention.
Figure 2:
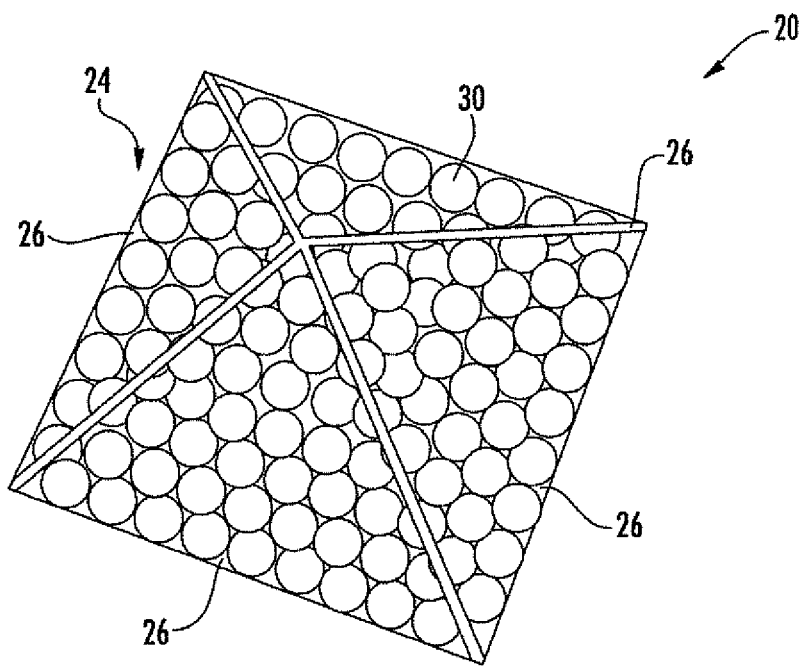
FIG. 2 is a top perspective view of the insect repellent apparatus illustrated in FIG. 1.
Figure 3:
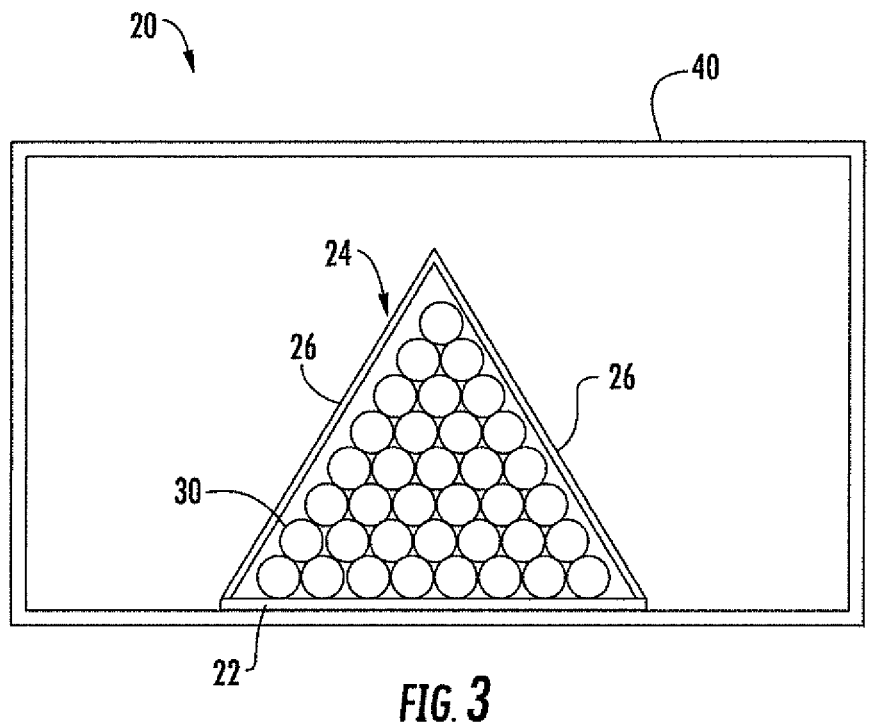
FIG. 3 is a side view of the insect repellent apparatus illustrated in FIG. 1 within a protective enclosure.
Figure 4:
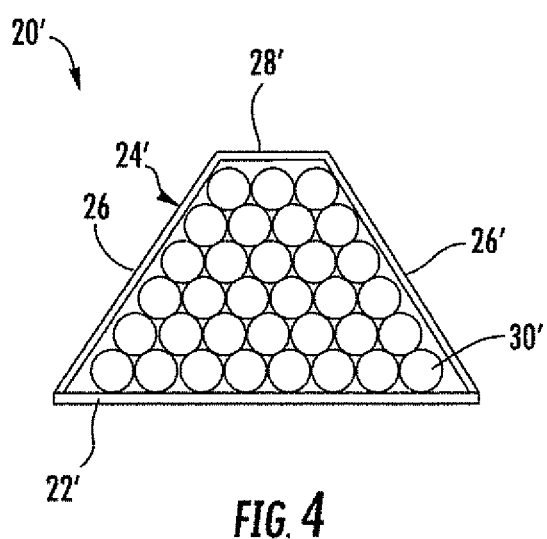
FIG. 4 is a side view of another embodiment of the insect repellent apparatus illustrated in FIG. 1 with the top truncated.
Figure 5:
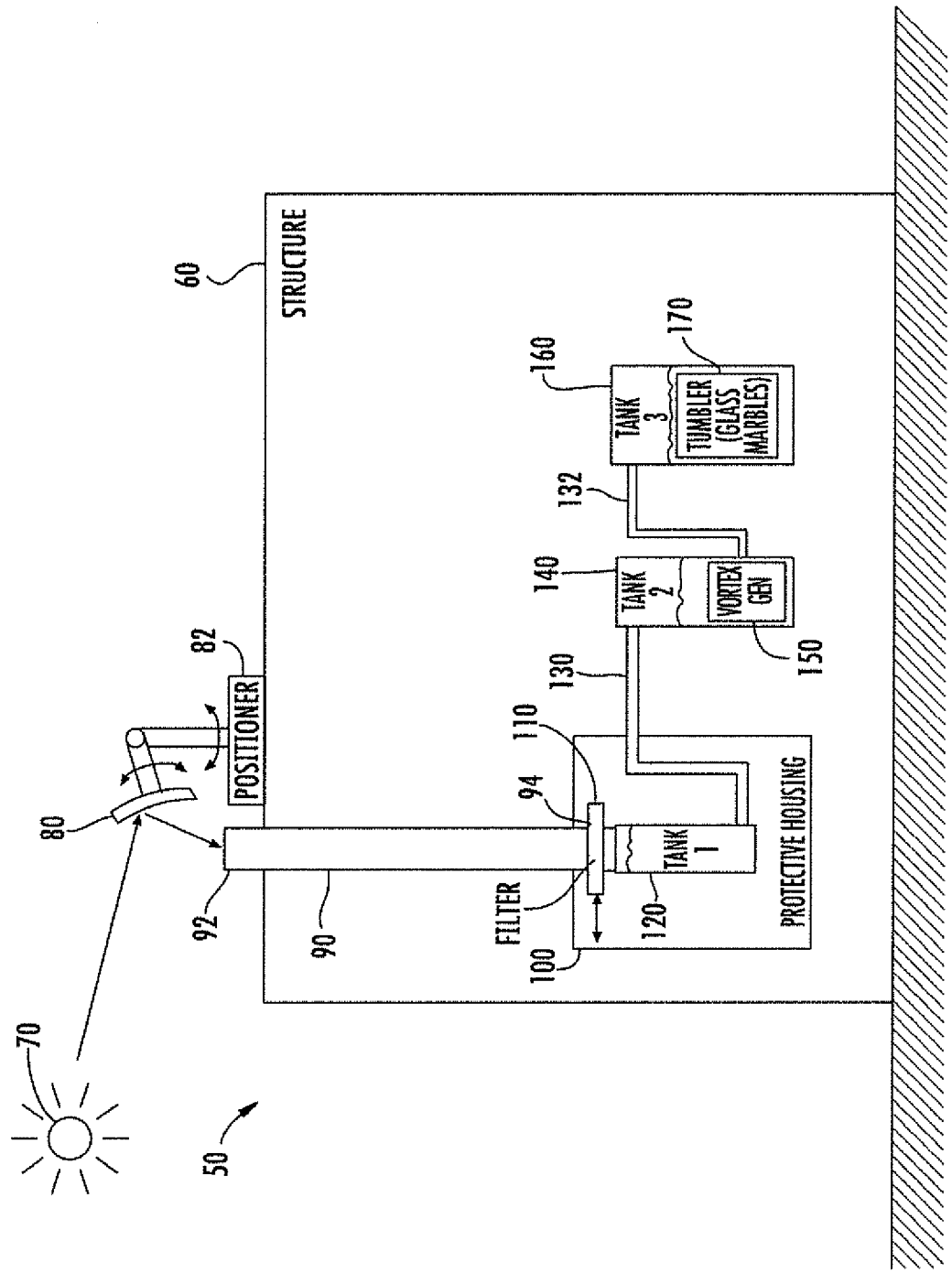
FIG. 5 is a block diagram of a system for imprinting the glass marbles illustrated in FIG. 1.

Referring initially to FIGS. 1 and 2, an insect repellent apparatus 20 includes a base 22, and a body 24 coupled to the base and having slopped sidewalls 26. A plurality of imprinted glass marbles 30 is carried by the body 24. Each imprinted glass marble 30 is configured to transmit terahertz frequencies from 300 GHz to 3 THz. The slopped sidewalls 26 direct the transmitted terahertz frequencies above the body 24.

The transmitted terahertz frequencies alter the environment in an area where the insect repellent apparatus 20 is located. When insects fly into the terahertz frequencies they are repelled. The terahertz frequencies have a positive charge energy field associated therewith. Insects typically have a negative charge energy field, and when then they fly into the positive energy field, they are repelled.

In the illustrated embodiment, the base 22 has a rectangular shape, and the slopped sidewalls 26 of the body 24 are angled towards one another so as to form a pyramid.

The body 24 is made out of a transparent material, such as acrylic glass, for example. Acrylic glass is a term for a hard clear plastic, commonly known by the brand names Plexiglas, Lucite, or Perspex. The base 22 may also be made out of acrylic glass. Alternatively, the base 22 may be made out of non-transparent materials.

In the illustrated embodiment of the insect repellant apparatus 20, a thickness of the base 22 is 0.25 inches and a thickness of the sidewalls 26 is 0.125 inches. Nonetheless, these numbers may vary depending on the size of the apparatus 20 as well as the intended environment.

To protect the insect repellent apparatus 20 while out in its intended environment, the apparatus may be placed in an enclosure 40, as illustrated in FIG. 3. The enclosure 40 is also made out of a transparent material, such as acrylic glass.

In another embodiment of the insect repellant apparatus 20', the body 24' has an upper surface 28' parallel to the base 22'. The slopped sidewalls 26' of the body 24' are angled towards the upper surface 28' so as to form a frustum pyramid, as illustrated in FIG. 4.

The insect repellent apparatus 20 may be placed in room, for example, to create a no fly zone for insects. The insect repellent apparatus 20 may be sized for residential and commercial applications. For illustration purposes, if the dimension of each side of a triangle forming the pyramid shape of the transparent enclosure 44 is 6 inches by 6 inches by 6 inches, then approximately 5,000 square feet may be covered by the insect repellant apparatus 20.

The number of imprinted glass marbles 30 carried by the body 24 determines the strength of the transmitted terahertz frequencies. As the number of imprinted glass marbles 30 increase so does the strength of the transmitted terahertz frequencies.

If each imprinted glass marble 30 has a diameter of 0.5 inch, then there are approximately 208 glass marbles carried by the body 24. The imprinted glass marbles 30 are not limited to any particular size. The diameter of the imprinted glass marbles 30 may also vary in size depending on the area in which the apparatus 20 will be placed. For example, the diameter of the imprinted glass marbles 30 may vary within 0.5 inches to 2 inches.

Each imprinted glass marble 30 comprises quartz or natural glass. Quartz is a hard white or colorless mineral consisting of silicon dioxide. Natural glass is glass that does not include impurities, chemicals or lead. With respect to being imprinted, quartz typically remains imprinted longer than natural glass. However, a disadvantage of quartz is that it is more expensive than natural glass.

Referring now to FIG. 5, an imprinting system 50 for imprinting the glass marbles 30 will be discussed. The imprinting system 50 is associated with a structure 60, such as a building. As will be discussed in greater detail below, water is initially imprinted, as disclosed in U.S. Pat. No. 8,389,035, for example. The imprinted water is then used to imprint the glass marbles 30.

The imprinting system 50 uses natural sunlight and its inherent radiation to imprint electro-optical information into the water using a spectral region known as terahertz radiation with wavelengths of 100 micrometers to 1 millimeter, which corresponds to frequencies from 300 GHz to 3 THz.

The active frequency for the imprinted water as well as the glass marbles 30 is at approximately 1 terahertz. This frequency is still part of the extreme far infrared spectrum emitted by the sun and is readily absorbed by water. The sun is a natural source that acts as a template or hard drive to allow the transformation process to take place allowing non-ionizing radiation to imprint traits and characteristics into the water which in turn is passed to the glass marbles 30.

The electro-optical frequencies from the sun 70 strikes a reflective surface 80, such as a polished stainless steel mirror positioned on top of the structure 60. The mirror 80 is rotationally driven by a positioner 82 to track a path of the sun 70 in azimuth and elevation. The polished stainless steel of the mirror 80 helps to reduce refraction effects.

The electro-optical radiation is reflected downward from the mirror 80 into a skylight tube 90. The skylight tube 90 has a first end 92 extending in height external the structure and a second end 94 extending internal the structure. In the illustrated embodiment, the skylight tube 90 has a diameter of 3 feet and a length of 11 feet, for example.

The skylight tube 90 is made of polished stainless steel, for example. The first end 92 of the skylight tube 90 receives the reflected sun from the mirror 80. The second end 94 of the skylight tube 90 is received by a protective housing 100.

The protective housing 100 may measure 5 feet wide by 5 feet deep and by 9 feet in height, for example. The protective housing 100 is made of gas concrete covered with Mu-Metal to provide electromagnetic shielding. This also serves to eliminate interference from x-rays and microwave effects, such as the effects seen with cell phones.

In an upper surface of the protective housing 100 is a polarization filter 110. The polarization filter 110 is adjacent the second end 94 of the skylight tube 90 so as to filter the reflected sunlight. The polarization filter 110 is removable when the reflected sunlight is not to be filtered.

The protective housing 100 includes a first water tank 120 that receives the filtered and unfiltered reflected sunlight based on positioning of the polarization filter 110. The first water tank 120 is directly under the second end 94 of the skylight tube 90. The first water tank 120 is made of clear acrylic tubing, has a diameter of 18 inches and stands 6 feet high, for example. There is no top cover so as to ensure that there are no obstructions to the flow of electro-optical radiation.

The first water tank 120 is filled with high quality spring water. In this process, only normal ionized spring water may be used since deionizer demineralized water, such as reverse osmosis water, for example, does not have the ability to absorb terahertz radiation or store any imprinted information.

There are two process steps that take place in the first water tank 120. The first process step is directed to terahertz frequency absorption from the reflected sunlight. The polarization filter 110 is removed so that the reflected sunlight is unfiltered. The water imprint tank 120 is filled with 250 liters of high quality spring water. The mirror 80 on top of the structure 60 is positioned electronically to reflect the sunlight downwards through the skylight tube 90 and into the water imprint tank 120. The time frame for this step is 1 to 2 hours depending on the amount of sunlight being reflected.

The first process step allows for the electro-optical radiation to strike the water directly without any obstruction. The spring water in the first water tank 120 absorbs any inherent terahertz radiation frequencies, especially those in the far infrared end of the spectrum.

The second process step is directed to polarization. The polarization filter 110 is inserted so that the reflected sunlight is filtered. In this process step, all of the reflected sunlight that is received by the water imprint tank 120 is filtered so that polarized light is block. Polarized light waves are light waves in which the vibrations occur in a single plane. The process of transforming unpolarized light into polarized light is known as polarization. The time frame for this step is 1 to 2 hours depending on the amount of sunlight being reflected.

One of the properties of sunlight is its wave particle duality. The first process step encompasses the particle aspect of the waves of sunlight. Using the high photonic energy of the unobstructed sunlight the polarized light has the ability to change the electromagnetic spin of the electrons in the water molecules. This process synchronizes the water molecules into certain formations allowing the water to keep and store the terahertz radiation. The polarized light particles and cosmic radiation entering the first water tank 120 after polarization and creation of coherence create light waves whose electric field vectors vibrating in a single plane by filtration can alter the wavelength of the water molecules by being absorbed.

After the first and second process steps have been completed, 125 liters of the water in the first water tank 120 are pumped into a second water tank 140 via a connection pipe 130. The second water tank 140 is external the protective housing 100 but within the structure 60. The second water tank 120 is similar to the first water tank 120. The second water tank 120 is also made of clear acrylic tubing, and has a diameter of 18 inches and stands 6 feet high, for example.

The second water tank 140 is equipped with a left turning vortex generator 150, which acts like a "burn-in" device and influences the prepared water. The vortex generator 150 stays on for 1 hour to create a finished product. After the third process step is completed, the water is imprinted.

As readily appreciated by those skilled in the art, water consists of $H_2O$ with two hydrogen molecules and one oxygen molecule. Atomic spectra measure radiation absorbed or emitted by electrons jumping from one state to another which eventually gave rise to the angular momentum vector in addition to the orbital motion of the electron. The completion of the above multi-step process further illustrates the electro-magnetism associated with the water molecules.

The vortex generator 150 is used to further augment this process. Generation of a vortex allows for a spinning, turbulent, flow of water which allows the polarized photons the opportunity and time to switch the electromagnetic spin of the electrons. The speed and rate of rotation of the fluid are greatest at the center and decreased progressively with distance from the center. This forced vortex or rotational vortex allows for further acceleration of the electromagnetic field such as a vision of a tornado, hurricane, or whirlpool. After the vortex generator 150 is turned off, the water in second water tank 140 is to remain undisturbed for 1 hour.

In a fourth process step, the imprinted water from the second water tank 140 is pumped to a third water tank 160 via connection pipe 132. The third water tank 160 includes a tumbler 170. The tumbler 170 is to receive the glass marbles. The tumbler 170 rotates the glass marbles within the imprinted water. The glass marbles are rotated so that they evenly absorb the terahertz frequencies from the imprinted water.

The time frame for operating the tumbler 170 varies depending on the strength of the terahertz radiation to be absorbed by the glass marbles. In the illustrated example, the glass marbles are continuously tumbled within a range of 8 to 12 days. Instead of a tumbler 170, other devices or approaches may be used to rotate the glass marbles within the third water tank 160.

Figure 6:
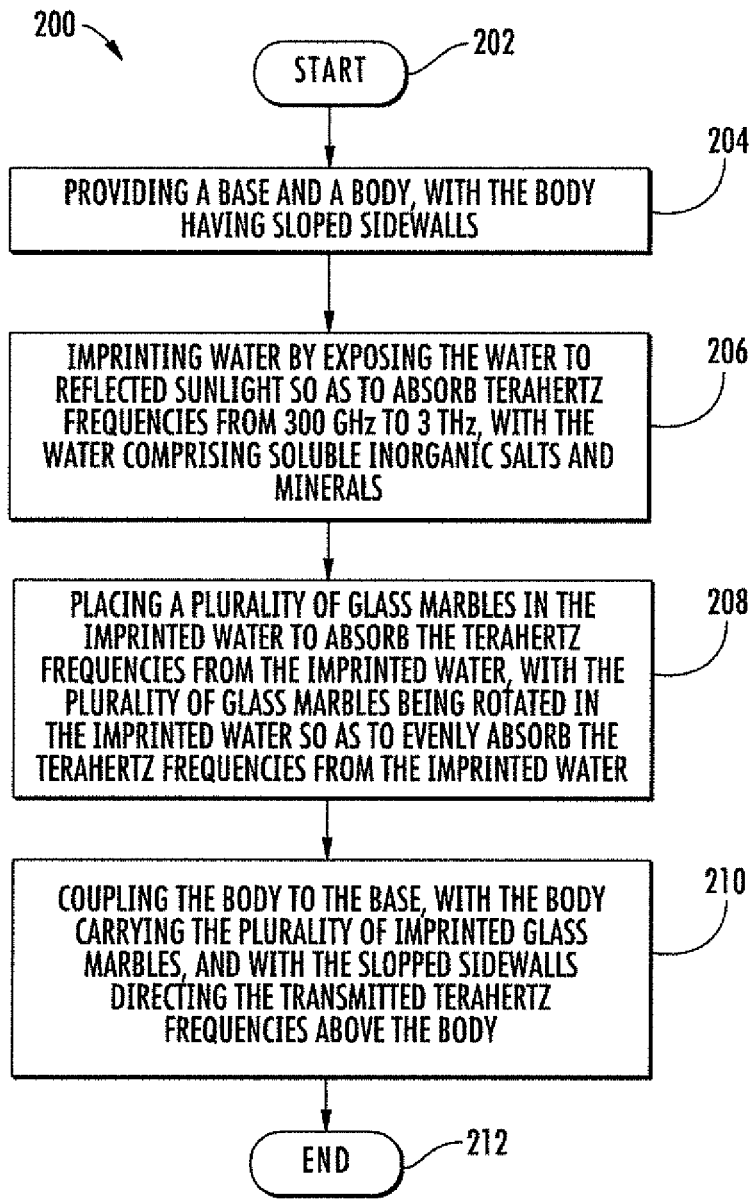
FIG. 6 is a flowchart illustrating a method for making the apparatus illustrated in FIG. 1.

Another aspect is directed to a method for making the insect repellant apparatus 20 as described above. Referring to the flowchart 200 in FIG. 6, the method comprises from the start (Block 202), providing a base 22 and a body 24, with the body having slopped sidewalls at Block 204.

The method further includes imprinting water at Block 206 by exposing the water to reflected sunlight so as to absorb terahertz frequencies from 300 GHz to 3 THz. The water comprises soluble inorganic salts and minerals. Glass marbles are placed in the imprinted water to absorb the terahertz frequencies from the imprinted water at Block 208. This results in the glass marbles being imprinted. Next, the body 24 is coupled to the base 22 at Block 210, with the body carrying the imprinted glass marbles, and with the slopped sidewalls 26 directing the transmitted terahertz frequencies above the body. The method ends at Block 212.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the foregoing description.

That which is claimed:

1. An apparatus comprising:
   a base;
   a body coupled to said base and having slopped sidewalls; and
   a plurality of imprinted glass marbles carried by said body, each imprinted glass marble configured to transmit terahertz frequencies from 300 GHz to 3 THz;
   said slopped sidewalls directing the transmitted terahertz frequencies above said body.

2. The apparatus according to claim 1 wherein said body comprises a transparent material.

3. The apparatus according to claim 2 wherein said body comprises acrylic glass.

4. The apparatus according to claim 1 wherein said plurality of imprinted glass marbles have a same size.

5. The apparatus according to claim 1 wherein each imprinted glass marble comprises quartz.

6. The apparatus according to claim 1 wherein each imprinted glass marble comprises natural glass that is devoid of impurities, chemicals and lead.

7. The apparatus according to claim 1 wherein said base has a rectangular shape, and wherein the slopped sidewalls of said body are angled towards one another so as to form a pyramid.

8. The apparatus according to claim 1 wherein said base has a rectangular shape, and wherein said body has an upper surface parallel to said base, with the slopped sidewalls of said body being angled towards the upper parallel surface so as to form a frustum pyramid.

9. The apparatus according to claim 1 further comprising a protective enclosure having an opening therein to receive said base and said body carrying said plurality of imprinted glass marbles.

10. An apparatus comprising:
a base having a rectangular shape;
a transparent body coupled to said base and having slopped sidewalls angled towards one another; and
a plurality of imprinted glass marbles carried by said transparent body, each imprinted glass marble configured to transmit terahertz frequencies from 300 GHz to 3 THz;
said slopped sidewalls directing the transmitted terahertz frequencies above said body.

11. The apparatus according to claim 10 wherein said transparent body comprises acrylic glass.

12. The apparatus according to claim 10 wherein each imprinted glass marble comprises at least one of quartz, and natural glass that is devoid of impurities, chemicals and lead.

13. The apparatus according to claim 10 wherein the slopped sidewalls of said body are angled towards one another so as to form a pyramid.

14. The apparatus according to claim 10 wherein said body has an upper surface parallel to said base, with the slopped sidewalls of said body being angled towards the upper parallel surface so as to form a frustum pyramid.

15. A method for making an apparatus comprising:
providing a base and a body, with the body having slopped sidewalls;
imprinting a plurality of glass marbles, each imprinted glass marble configured to transmit terahertz frequencies from 300 GHz to 3 THz;
coupling the body to the base, with the body carrying the plurality of imprinted glass marbles, and with the slopped sidewalls directing the transmitted terahertz frequencies above the body.

16. The method according to claim 15 wherein imprinting the plurality of glass marbles comprises:
imprinting water by exposing the water to reflected sunlight so as to absorb terahertz frequencies from 300 GHz to 3 THz, with the water comprising soluble inorganic salts and minerals; and
placing the plurality of glass marbles in the imprinted water to absorb the terahertz frequencies from the imprinted water.

17. The method according to claim 16 wherein the reflected sunlight is passed through a polarization filter.

18. The method according to claim 16 further comprising rotating the plurality of glass marbles in the imprinted water so as to evenly absorb the terahertz frequencies from the imprinted water.

19. The method according to claim 15 wherein the body comprises a transparent material.

20. The method according to claim 15 wherein each imprinted glass marble comprises at least one of quartz, and natural glass that is devoid of impurities, chemicals and lead.

21. The method according to claim 15 wherein the base has a rectangular shape, and wherein the slopped sidewalls of the body are angled towards one another so as to form a pyramid.

22. The method according to claim 15 wherein the base has a rectangular shape, and wherein the body has an upper surface parallel to the base, with the slopped sidewalls of the body being angled towards the upper parallel surface so as to form a frustum pyramid.

23. The method according to claim 15 further comprising providing a protective enclosure having an opening therein to receive the base and the body carrying the plurality of imprinted glass marbles.

* * * * *